(12) United States Patent
Hansen et al.

(10) Patent No.: US 8,445,087 B2
(45) Date of Patent: May 21, 2013

(54) HYDROGENATED STYRENIC BLOCK COPOLYMERS BLENDS WITH POLYPROPYLENE

(75) Inventors: David Hansen, Fulshear, TX (US); Ruidong Ding, Shanghai (CN); Daniel Connor, Inman, SC (US); Nathan Mehl, Spartanburg, SC (US)

(73) Assignees: Kraton Polymers U.S. LLC, Houston, TX (US); Milliken and Company, Spartanburg, SC (US)

( * ) Notice: Subject to any disclaimer, the term of this patent is extended or adjusted under 35 U.S.C. 154(b) by 142 days.

(21) Appl. No.: 13/133,556

(22) PCT Filed: Dec. 14, 2009

(86) PCT No.: PCT/US2009/067827
§ 371 (c)(1),
(2), (4) Date: Aug. 24, 2011

(87) PCT Pub. No.: WO2010/077799
PCT Pub. Date: Jul. 8, 2010

(65) Prior Publication Data
US 2011/0300321 A1    Dec. 8, 2011

Related U.S. Application Data

(60) Provisional application No. 61/122,612, filed on Dec. 15, 2008.

(51) Int. Cl.
*B29D 22/00* (2006.01)
*B29D 23/00* (2006.01)
*B32B 1/08* (2006.01)

(52) U.S. Cl.
USPC .......... 428/35.7; 428/500; 525/96; 525/92 D; 525/240; 525/241; 526/160; 526/245; 526/902

(58) Field of Classification Search
USPC ................. 428/35.7, 500; 525/96, 92 D, 240, 525/241; 526/160, 245, 902
See application file for complete search history.

(56) References Cited

U.S. PATENT DOCUMENTS

| | | | |
|---|---|---|---|
| 3,222,856 | A | 12/1965 | Haynes |
| 3,231,635 | A | 1/1966 | Holden et al. |

(Continued)

FOREIGN PATENT DOCUMENTS

| | | |
|---|---|---|
| EP | 1491578 A1 | 12/2004 |
| WO | 03087175 A1 | 10/2003 |
| WO | 2005092978 A1 | 10/2005 |

OTHER PUBLICATIONS

Raab M et al; "The effect of specific nucleation on tensile mechanical behaviour of isotactic polypropylene", European Polymer Journal, Pergamon Press Ltd., Oxford, GB, vol. 40, No. 7, Jul. 1, 2004, pp. 1317-1323.

(Continued)

*Primary Examiner* — Michael C Miggins
(74) *Attorney, Agent, or Firm* — Clements Bernard LLC; Michael A. Masse

(57) ABSTRACT

The present invention comprises a molding composition comprising at least about 70% wt. polypropylene or polypropylene random copolymer; up to about 30 wt. % of a block copolymer composition comprising at least one selectively hydrogenated block copolymer which substantially matches the index of refraction of the polypropylene or polypropylene random copolymer, and up to about 0.70% by wt. of a clarifying agent, wherein the weight % of the total blend is 100%. The present invention also may be a molded article produced from the molding composition. A molded article formed from such a composition at a thickness of 0.125 inches will have a haze of less than about 50% and an instrumented impact toughness of at least 100 inch-lbs at −20° C. to −30° C.

18 Claims, 1 Drawing Sheet

U.S. PATENT DOCUMENTS

| | | |
|---|---|---|
| 3,265,765 A | 8/1966 | Holden et al. |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 4,426,495 A | 1/1984 | Vitus et al. |
| 4,444,953 A | 4/1984 | St. Clair |
| 4,588,777 A | 5/1986 | Hotta |
| 4,904,731 A | 2/1990 | Holden et al. |
| 5,412,020 A | 5/1995 | Yamamoto et al. |
| 5,973,071 A | 10/1999 | Modic |
| 2001/0025090 A1 | 9/2001 | Moriya et al. |
| 2001/0051688 A1 | 12/2001 | Kurata et al. |
| 2003/0204019 A1 | 10/2003 | Ding et al. |
| 2004/0044107 A1 | 3/2004 | Kikuchi et al. |
| 2006/0173108 A1 | 8/2006 | Xu et al. |
| 2007/0066733 A1 | 3/2007 | Hanssen et al. |

OTHER PUBLICATIONS

Supplementary European Search Report, Aug. 28, 2012.

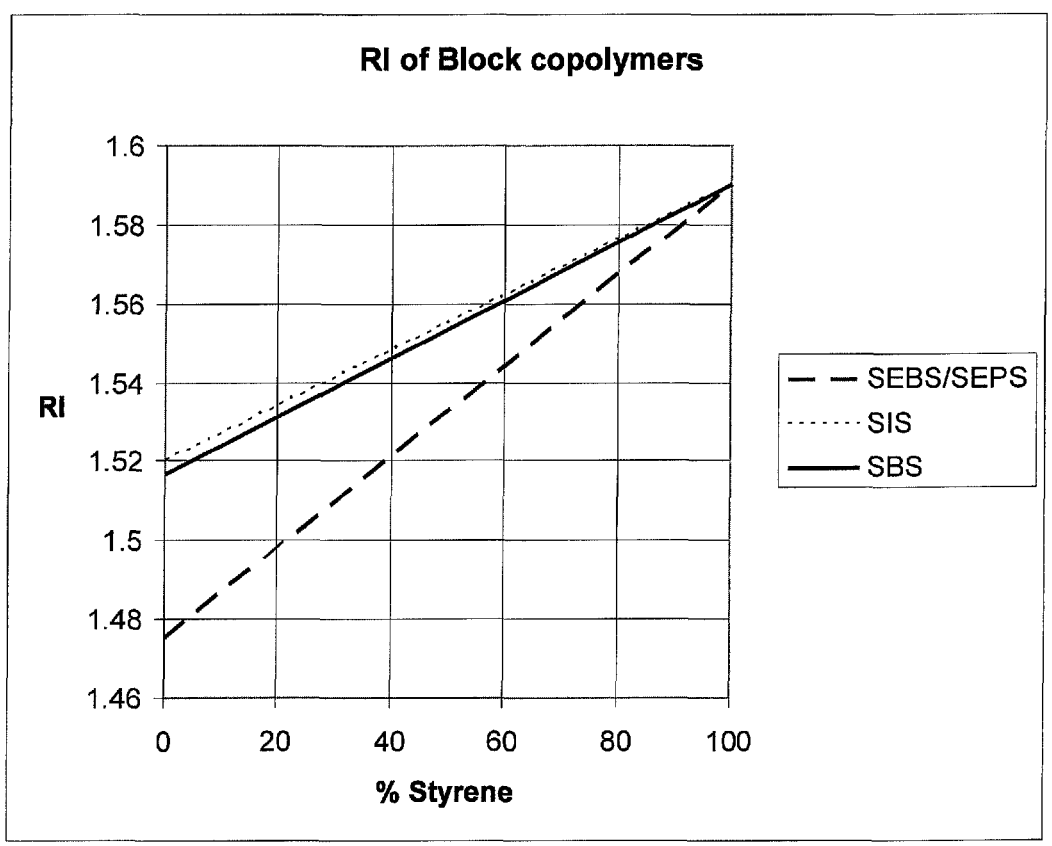

HYDROGENATED STYRENIC BLOCK COPOLYMERS BLENDS WITH POLYPROPYLENE

Applicants hereby claim the benefit of U.S. Provisional application 61/122,612 filed Dec. 15, 2008.

BACKGROUND OF THE INVENTION

1. Field of the Invention

The invention is directed to molding compositions comprising selectively hydrogenated styrenic block copolymers and polypropylene or polypropylene random copolymers, and additional clarifying agent. The invention is also directed to molded articles made from the molding compositions. The molding compositions and the articles made from them have a unique combination of low temperature impact strength and low haze (good clarity). Although such blends have unique balance of good impact strength and low haze at low temperature, the same unique properties of improved impact strength and low haze are also present at room temperature (20 to 30° C., for example).

2. Prior Art

It is known that polypropylene or polypropylene random copolymers can make good molded articles such as food storage containers, for example. Polypropylene and polypropylene random copolymers, however, tend to crystallize with large crystallites and the haze of such containers is often quite high. Random polypropylene copolymers tend to be slightly clearer than the polypropylene homopolymer and are thus usually preferred for ultimate clarity. It is known that adding a small amount (0.18 to 0.22 wt. %) of a clarifying agent causes the crystallites of the homo-polypropylene or polypropylene random copolymer to remain small and become more numerous, thus reducing the haze significantly. Although such food containers made from polypropylene or polypropylene copolymers with clarifying agents have low haze, they have poor toughness and impact strength, especially at low temperatures. Specifically, such containers often shatter because they become very brittle at temperatures of 0° C. or lower. In order to improve the impact strength of polypropylene molded articles, it is known to add elastomeric polymers.

U.S. Pat. No. 4,904,731 issued to Holden and Hansen (and assigned to one of the assignees of the present invention) discloses a polymeric composition comprising homo-polypropylene and polypropylene random copolymers, a hydrogenated block copolymer containing predominantly monoalkenyl aromatic hydrocarbon monomer units and at least one block containing predominantly hydrogenated, conjugated diolefin monomer units and linear low density polyethylene. The hydrogenated styrene block copolymer used in the examples had 30 wt % styrene and the best ethylene copolymers had a density around 0.917 g/cm3. Such a polymeric composition is stated to have or exhibit improved clarity and good impact strength when mixed together in a ratio of 1:1. It is noted, however, that this composition was only tested for Gardner impact strength at −10° C. at levels of 12.5-15 wt % impact modifier (the hydrogenated styrene block copolymer). Moreover, the clarity was not as good as achieved in this present invention, nor is there is any mention of the clarifying agents or the criticality of the level of clarifying agent which according to this present invention is key in achieving the best clarity. Lastly, the hydrogenated styrene block copolymer and the polyethylene copolymer used in the examples were not optimum for achieving the best match of the index of refraction with the polypropylene random copolymer which is important to achieve the best clarity. There was also no mention for the need to match the index of refraction which is important to achieve good clarity even if high levels of clarifying agent are used.

Polypropylene polymers can achieve low temperature impact at −20° C. to −30° C. if high levels of ethylene copolymers with low densities (typically 0.86 to 0.87 g/cc) are added or if the polyethylene copolymers are polymerized in situ (typically referred to as polypropylene impact copolymers) but these copolymers have extremely poor clarity (90-100% haze in 0.125 inch thick injection molded articles) because of the poor index of refraction match and large rubber particle size. Thus there is a need in the art to create blends of homo-polypropylene or polypropylene random copolymers with an elastomeric polymer that would provide ample clarity (a haze level of less than about 50% haze for a 0.125 inch thick injection molded disk or article), while maintaining sufficient impact strength to prevent a molded article, such as a food container for freezers, from cracking or shattering, especially at −20° C. to −30° C.

BRIEF DESCRIPTION OF THE DRAWINGS

FIG. 1 is a plot of the index of refraction as a function of styrene content for various block copolymers.

SUMMARY OF THE INVENTION

The present invention concerns a molding composition for packaging articles comprising a blend of homo-polypropylene or polypropylene random copolymer and a block copolymer composition comprising at least one selectively hydrogenated styrene-diene block copolymer with optimum levels of clarifying agent. In particular, the polypropylene random copolymers can contain other olefins, for example, ethylene, butylene, or octene in an amount less than about 6 wt. %, based on the total weight of the polypropylene random copolymer for enhanced clarity.

It is important that the selectively hydrogenated block copolymer should substantially match the refractive index of the polypropylene or polypropylene random copolymer to achieve good clarity and minimize light scattering. The meaning of "substantially matches" in the present invention is that the refractive indices of the polypropylene or polypropylene random copolymer and the block copolymer composition are within 0.010 refractive index units of each other. Because selectively hydrogenated styrene-diene block copolymers can contain a wide range of styrene, it is possible to adjust the styrene content to match the index of refraction of the polypropylene or the polypropylene random copolymer. As can be seen in FIG. 1, the diene portion of the block copolymer must be selectively hydrogenated or it will not match the index of refraction of the polypropylene random copolymer which is around 1.503. In addition, the styrene in the selectively hydrogenated diene in the styrene block copolymer can decrease the effectiveness of clarifying agents so it is necessary to also add additional clarifying agent to achieve optimum clarity, particularly when levels of about 20 wt % hydrogenated block copolymer are used in the blend to achieve good low temperature impact. With the present invention at levels of about 20% selectively hydrogenated block copolymer in the blend, it is beneficial to have at least 2500 ppm (parts per million) clarifying agent, and preferably 3000 ppm clarifying agent, and up to about 7000 ppm clarifying agent in the total composition/compound. Since most commercial clear, clarified polypropylene copolymers have 1800 to 2200 ppm clarifying agent, this means that an additional 500 to 1500 ppm must be added to achieve low haze and good clarity.

The optimum amount will depend upon the polypropylene or polypropylene random copolymer and the level of haze desired. At lower levels of selectively hydrogenated styrene block copolymer in the blend (less than 20%), there is less interference with the clarifying agent and thus less additional clarifying agent required. Replacing some of the optimum selectively hydrogenated block copolymer with polyethylene copolymers (typically with a density of about 0.9 g/cm3), which substantially match the index of refraction of the polypropylene or polypropylene random copolymer, can be beneficial in reducing the amount of additional clarifying agent needed since the polyethylene copolymers do not interfere with the clarifying agents. However, there are some compromises in low temperature impact when this approach is used.

The glass transition of the hydrogenated rubber block is important in achieving good impact at $-20°$ C. to $-30°$ C. Commercial hydrogenated styrenic block copolymers can have rubber blocks with glass transitions (Tg) ranging from about $-55°$ C. to $-15°$ C. as measured by differential scanning calorimetry (DSC) at a scan rate of $20°$ C./min depending upon the rubber phase composition and microstructure. Ethylene/butylene or ethylene/propylene rubber blocks with a DSC glass transition of about $-50°$ C. to $-55°$ C. are preferred to achieve the best low temperature impact properties. Hydrogenated styrene block copolymers with hydrogenated rubber blocks of polybutadiene or polyisoprene, which have glass transitions of about $-40°$ C. to $-15°$ C., do not achieve as good low temperature impact properties in polypropylene, but they are interesting for some clear polypropylene applications because they form submicron dispersions in the polypropylene so it is not necessary to match the index of refraction to prevent light scattering. It is possible, therefore, to use these special selectively hydrogenated styrenic block copolymers with low styrene content to minimize the interference with the clarifying agents, yet they are still clear even though the index of refraction does not match the polypropylene.

In the broadest sense, the present invention may comprise at least a three part composition comprising at least about 70 wt. % polypropylene or polypropylene random copolymer; up to about 30 wt. % selectively hydrogenated styrene-diene block copolymers, and up to about 0.7% by wt. clarifying agent, wherein the weight % of the total blend is 100%.

In the broadest sense, the present invention also may be a molded article produced from the composition comprising at least about 70 wt. % polypropylene or polypropylene random copolymer; up to about 30 wt. % selectively hydrogenated styrene-diene block copolymers, and up to about 0.7% by wt. clarifying agent, wherein the weight % of the total blend is 100%. Preferably, the composition comprises at least about 75 wt. % polypropylene or polypropylene random copolymer and up to about 25 wt. % selectively hydrogenated styrene-diene block copolymers, and up to about 0.5% by wt. clarifying agent, wherein the weight % of the total blend is 100%. More preferably, the composition comprises at least about 80 wt. % polypropylene or polypropylene random copolymer; up to about 20 wt. % selectively hydrogenated styrene-diene block copolymers, and up to about 0.4% by wt. clarifying agent, wherein the weight % of the total blend is 100%.

Injection molded disks comprising the composition of the present invention have haze values less than 50% when measured on disks 0.125 inch thick. In addition the molding composition and articles made from the molding composition have impact properties which are significantly improved over the polypropylene or polypropylene copolymer itself. In particular, the impact strength of the molding compositions or articles is at least about 100 inch-lbs in the temperature range of about $-20°$ C. to about $-30°$ C.

DETAILED DESCRIPTION OF THE PREFERRED EMBODIMENTS

To provide polypropylene or random polypropylene copolymers with good low temperature impact strength, a rubbery compatible component is necessary. Selectively hydrogenated styrene-diene block copolymers (where only the diene block is hydrogenated) are compatible with polypropylene and forming micron and submicron dispersions in the polypropylene when melt mixed at temperatures of usually $180°$ C. or greater.

The selectively hydrogenated styrene block copolymers of the present invention are generally those containing blocks of polymerized monoalkenyl aromatic hydrocarbon monomers units (S) and a hydrogenated diene block (polymerized conjugated diolefin monomer) (HD). The S block is a glassy block typically at the terminal end of the block copolymer. The S block can be in the form of polymerized styrene, alpha-methylstyrene, para-methylstyrene, ortho-methylstyrene, para-tertbutylstyrene, dimethy-styrene, and mixtures of two or more of these. The hydrogenated diene block can be in the form of hydrogenated polybutadiene, polyisoprene, polypentadiene, polyhexadiene, or mixtures of 2 or more of these. The HD block is a rubber and is typically not at the terminal end of the block copolymer and is commonly referred to as a rubber midblock. The more common hydrogenated rubber blocks are hydrogenated polybutadiene, hydrogenated polyisoprene, and hydrogenated isoprene-butadiene copolymer. When the polybutadiene block is hydrogenated it creates a block of ethylene-butylene copolymer where the ratio of the ethylene and butylene depends upon the microstructure (or vinyl content) of the polybutadiene. The vinyl content is a measure of the amount of 1,2-addition occurring during butadiene polymerization and can be carefully controlled. A preferred ratio of ethylene to butylene is about 40 wt % butylene to achieve low modulus and a low glass transition of around $-55°$ C. as measured by DSC.

In general, any of the selectively hydrogenated block copolymers comprising at least one polymeric blocks containing predominantly polymerized monoalkenyl aromatic hydrocarbon monomer units and at least one polymeric block containing predominantly polymerized conjugated diolefin monomer units, which are hydrogenated after incorporation into the polymer, known in the prior art may be used as a component in the polymer compositions of this invention. Suitable hydrogenated block copolymers may be prepared by hydrogenating a block copolymer prepared in accordance with techniques well known in the prior art such as those describe in U.S. Pat. Nos. 3,231,635; 3,265,765; 3,322,856; 4,426,495 and 4,444,953, the disclosure of which patents are incorporated herein by reference. In general block copolymer which may be hydrogenated to form the hydrogenated block copolymer useful in the polymeric composition of this invention will have one of the following general formulae: S-HD-S or (S-HD)x-Z where x can be a value of 1 to 20 which will form diblocks, triblocks, or multiarm polymers and Z is a coupling agent. In general, each polymeric S block may have the same or different weight average molecular weight with the range from about 4,000 to about 50,000 and each hydrogenated polymeric rubber block, HD, may have an average molecular weight ranging from about 10,000 to about 200,000. In a preferred embodiment, each polymeric block S will have approximately the same weight average molecular weight within the range from about 5,000 to about 10,000 and each polymeric hydrogenated HD block will have an average molecular weight with the range from about 25,000 to about 100,000.

The block copolymer composition of the present invention may also comprise a polyethylene copolymer. Examples of suitable polyethylene copolymers are poly(ethylene octene) copolymers such as Engage 8402 from Dow Chemical and Exact 0203 from Exxon Chemical. In this embodiment the selectively hydrogenated block copolymer may be replaced by up to 50% of a polyethylene copolymer that substantially matches the random polypropylene copolymer. The polyethylene copolymer should have a density close to 0.9 g/cm3 so it can closely match the index of refraction of the polypropylene or polypropylene random copolymer. Preferably the polyethylene copolymer has an average refractive index of +/−0.008 or less refractive index units of that of the polypropylene or polypropylene copolymer.

As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

Selective Hydrogenation

In general, the block copolymers useful in the present invention may be selectively hydrogenated using any of the methods known in the prior art suitable for such hydrogenation. In general, the conditions used to hydrogenate the block copolymers useful in this invention will be selected to insure that at least 50%, preferably at least 80%, and most preferably at least 95% of the ethylenic unsaturation remaining in the conjugated diolefin polymer blocks after preparation is saturated as a result of the hydrogenation. The hydrogenation conditions will also be selected so as to insure that less than 20%, preferable less than 10% and mostly preferably less than 5% of the aromatic unsaturation in the monoalkenyl aromatic hydrocarbon polymer blocks is hydrogenated. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

Suitable styrene block copolymers are hydrogenated styrene-butadiene-styrene (S-B-S) and hydrogenated styrene-isoprene-styrene (S-I-S), and mixtures thereof. Preferably the styrene block copolymer is styrene-ethylene/butylene-styrene (S-E/B-S). The EB block results from the selective hydrogenation of butadiene. Hydrogenation of the diene block of S-I-S results in styrene-ethylene/propylene-styrene (S-E/P-S). The amount of styrene and the amount of hydrogenated rubber midblock can be varied to craft various refractive indices to match almost any propylene or propylene compositions. Alternatively, two or more selectively hydrogenated styrene block copolymers with substantially the same structure and chemical composition in the respective blocks but different styrene contents in the overall polymer can be melt blended together at temperatures typically above 180° C. to produce a molecularly compatible, clear, and intimate blends which will exhibit a refractive index which is average of the blended polymers depending upon the styrene contents and weight percentages. In addition to melt mixing, one can also solution mix these polymers in a suitable solvent to achieve the same result.

Suitable polypropylene resin for the present invention can be obtained from any major supplier of polypropylene and polypropylene copolymers such as LyondellBasell, Dow, ExxonMobile, Total Petrochemicals, Flint Hills, or Mitsui. For optimum clarity the polypropylene is preferably a random polypropylene copolymer comprising, for example, other olefins (up to 6% by weight randomly copolymerized monomer) such as ethylene, butylene, hexene, and/or octene. For the best clarity, normally 1800 ppm to 2200 ppm of a clarifying agent is incorporated in commercial polypropylene or polypropylene random copolymers to reduce the size of crystallites so less light is scattered and the part appears clearer. The amount of clarifying agent is used sparingly since it is expensive relative to polypropylene.

For the purposes of the present invention the clarifying agent is one which is compatible with not only the polypropylene or polypropylene copolymer but also the block copolymer composition. Surprisingly, it has been found that inclusion of the block copolymer composition reduces the effectiveness of the clarifying agent. This is evident from the increased haze in the molding compositions even when the refractive indicies of the block copolymer composition and polypropylene or polypropylene copolymer are matched. Without wishing to be bound by theory, it is believed that the clarifying agent is "absorbed" by the block copolymer composition. Therefore, any clarifying agents which are compatible with and "absorbed" by the block copolymer will be within the scope of the present invention.

As noted above, the clarifying agent can be any suitable clarifying agent that is compatible with the polypropylene polymer (e.g., polypropylene homopolymer or polypropylene copolymer) and the block copolymer composition. One particular class of clarifying agents that is believed to be particularly well-suited for use in the composition of the present invention is the acetal compounds formed as the product of the condensation reaction between an aromatic aldehyde and a polyhydric alcohol. The polyhydric alcohols suitable for use in producing such acetal compounds include acyclic polyols such as xylitol and sorbitol. Aromatic aldehydes suitable for use in producing such acetal compounds typically contain a single aldehyde group with the remaining positions on the aromatic ring being either unsubstituted or substituted. Accordingly, suitable aromatic aldehydes include benzaldehyde and substituted benzaldehydes (e.g., 4-methylbenzaldehyde and 3,4-dimethylbenzaldehyde). The acetal compound produced by the condensation reaction can be a mono-acetal, di-acetal, or tri-acetal compound (i.e., a compound containing one, two, or three acetal groups, respectively), with the di-acetal compounds being preferred.

In a preferred embodiment, the clarifying agent is an acetal compound conforming to the structure of Formula (I) below:

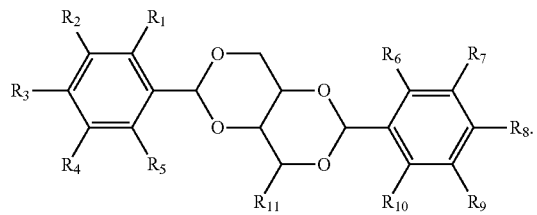

In the structure of Formula (I), $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, carboxyl groups, and halogens. $R_{11}$ is a hydroxyalkyl group selected from the group consisting of —$CH_2OH$ and —$CHOHCH_2OH$. In a preferred embodiment, $R_1$, $R_4$, $R_5$, $R_6$, $R_7$, and $R_{10}$ are each hydrogen, $R_2$, $R_3$, $R_8$, and $R_9$ are each alkyl groups, and $R_{11}$ is —$CHOHCH_2OH$. In a more specific embodiment, $R_1$, $R_4$, $R_5$, $R_6$, $R_7$, and $R_{10}$ are each hydrogen, $R_2$, $R_3$, $R_8$, and $R_9$ are each methyl groups, and $R_{11}$ is —$CHOHCH_2OH$. In another preferred embodiment, $R_1$, $R_2$, $R_4$, $R_5$, $R_6$, $R_7$, $R_9$, and $R_{10}$ are each hydrogen, $R_3$ and $R_8$ are each alkyl groups, and $R_{11}$ is —$CHOHCH_2OH$. In a more specific embodiment, $R_1$, $R_2$, $R_4$, $R_5$, $R_6$, $R_7$, $R_9$, and $R_{10}$ are each hydrogen, $R_3$ and $R_8$ are each methyl groups, and $R_{11}$ is —$CHOHCH_2OH$.

A widely used clarifying agent for polypropylene is a sorbitol acetal (i.e., 1,3:2,4-bis(3',4'-dimethylbenzylidene) sorbitol) that can be obtained from Milliken Chemical under the trade name Millad® 3988 clarifying agent or masterbatches of Millad® 3988 clarifying agent in polypropylene. In the present invention at least 2500 ppm, and more preferably about 3000 ppm of the clarifying agent is present. Below 2500 ppm the composition is unacceptably hazy when 20 wt % block copolymer composition is present in the polypropylene or polypropylene copolymer. The amount of clarifying agent can be up to about 7000 ppm. Above 7000 ppm no further beneficial effect is achieved. It is believed that the above concentration range would be suitable for all clarifying agents, particularly sorbitol acetal clarifying agents, with polypropylene or polypropylene random copolymers.

The general premise is that the styrene block copolymer must match or substantially match the refractive index of the polypropylene component used. Accordingly, if typical polypropylene random copolymer is used in the blend compositions of the present invention, it has a comonomer content of about 4% and a refractive index of about 1.503. If, however, the polypropylene has, for example, more or less comonomer, or is crystallized under unique conditions, the refractive index of the polypropylene random copolymer will change depending upon the degree of crystallinity. So, with the present invention it is necessary to know or measure the refractive index of the polypropylene component such that this refractive index can be matched or substantially matched by the many different forms of styrene block copolymers that can be manufactured or blended. Generally, the styrene weight percent of the selectively hydrogenated styrene block copolymer or blend of selectively hydrogenated styrene block copolymers should be in a range of from about 20-30% by wt., and preferably in a range from about 23-26 wt. % to achieve appropriate matching of the index of refraction of the polypropylene or polypropylene random copolymer.

Because the styrene block copolymers are clear (the styrene domains are too small to scatter light), blending them with polypropylene or polypropylene copolymer can be beneficial for clarity as long as the index of refraction substantially matches the polypropylene random copolymer. As these rubbery styrene block copolymers provide the toughness and impact strength, especially at low temperatures, using a higher percentage in the blend of the selectively hydrogenated styrene block copolymer allows the blend to avoid cracking and shattering when it is employed in a molded article. Using more styrene block copolymer in the blend does not significantly impact the haze as long as the index of refraction is substantially matched and additional clarifying agent is added.

In the context of the present invention and with reference to the indicies of refraction, "substantially matches" means that the difference in index of refraction of the block copolymer composition and the polypropylene or polypropylene copolymer is +/−0.008 or less. More preferred for the clear compositions and articles of the present invention is when the difference is +/−0.006 or less and most preferred is when the difference is +/−0.004 or less. When the indicies of refraction substantially match, the compositions and articles have low haze. In particular, the compositions and articles will have a haze of 50% or less when measured on disks 0.125 inch in thickness. More preferred for the embodiments of the present invention are compositions and articles which have haze of 40% or less.

It can be advantageous to have the clarifying agent in a polypropylene masterbatch to allow easier mixing. If blends of selectively hydrogenated block copolymers are used, it can be advantageous to premelt mix the block copolymers to insure intimate mixing and clarity. It is usually best not to premix (melt mix) the clarifying agent with the selectively hydrogenated styrene block copolymer because the clarifying agent needs to exist in the polypropylene phase of the mix as much as possible.

Preparing blends of the polypropylene or polypropylene random copolymer, selectively hydrogenated block copolymer and clarifying agent can be done in a number of different ways. All the components can be fed to a twin screw or single screw extruder (with appropriate mixing capability) in a single feed port or multiple feed ports and mixed at temperatures from 180° C. to 230° C. If the mixing is carried out at temperatures lower than 220° C., it is necessary injection mold parts from the pelletized compound at temperature of 220° C. to 230° C. to make sure the clarifying agent properly dissolves and disperses in the polypropylene resin. Otherwise, as is well known for sorbitol acetal clarifying agents, suboptimal clarity will be achieved.

The present invention can also be manufactured by dry-blending the polypropylene or polypropylene random copolymer with clarifying agent (or a masterbatch of the clarifying agent in polypropylene polymer) and with the selectively hydrogenated styrene block copolymer. This dry-blend can then be introduced directly into an injection molding machine which has a suitable mixing section in the screw. The dry blend method is less costly because there is no need for an extra mixing step. It is important to injection mold this composition at a suitably high temperature, roughly 220° C. to 230° C., to properly dissolve and disperse the clarifying agent into the polypropylene or random polypropylene copolymer. In this way the clarifying agent can produce the optimum clarity.

The molding compositions and articles made from the molding compositions of the present invention have significantly improved impact and shatter resistance over the polypropylene or polypropylene copolymers themselves. Importantly, this improved impact strength is a feature of the compositions and articles at temperatures as low as –20° C. to –30° C. as well as at room temperature. The preferred embodiments of the present invention have instrumented impact strengths of at least 100 inch-lbs at about –20° C. to about –30° C. In more preferred embodiments the instrumented impact strength in the same temperature range is at least 150 inch-lbs and most preferably at least 200 inch-lbs.

Depending on the application of this invention, other components known in the art such as dyes, various plasticizers, antiblocking agents, antioxidants, lubricants, and the like may be employed as long as they do not affect the clarity.

EXAMPLES

The below list of ingredients and blends were used in the various examples to demonstrate this invention:
Kraton G 1657 (from Kraton Polymers) 13 wt % styrene $(S-EB)_x$-Z block copolymer, index of refraction 1.490, EB (ethylene/butylene) rubber block has a Tg of about –55° C.
Kraton G 1652 (from Kraton Polymers) 30% wt % Styrene S-EB-S block copolymer index of refraction 1.509, EB rubber block has a Tg of about –55° C.
Kraton G 1643 (from Kraton Polymers), 20% styrene S-EB-S block copolymer, index of refraction of 1.500, EB rubber block glass transition temperature of about –35° C.
GH-893 Extruder mixed masterbatch of Kraton G 1652/Kraton G 1657 (67/33) index of refraction 1.502.
GH-893C Extruder mixed masterbatch of Kraton G 1652/Kraton G 1657/Engage 8402 (67/33/50 parts) (⅓ polyethylene copolymer in the masterbatch).
GH-893D Extruder mixed masterbatch of Kraton G 1652/Kraton G 1657/Engage 8402 (67/33/34 parts) (25% polyethylene copolymer in the masterbatch).
Total Polypropylene 6823 (from Total Petrochemicals) clarified polypropylene random copolymer, index of refraction about 1.500.
Pro-fax SR549M (from LyondellBasell) clarified polypropylene random copolymer, index of refraction 1.503.
Polypropylene P5M6K-048 (from Flint Hills Resources) clarified random polypropylene copolymer, index of refraction about 1.500.
Millad® concentrate 8C41-10 (from Milliken Chemical) masterbatch of 10% Millad® 3988 clarifying agent in polypropylene resin.
Millad® 3988 clarifying agent (from Milliken Chemical) sorbitol acetal clarifying agent (i.e., 1,3:2,4-bis(3',4'-dimethylbenzylidene) sorbitol).
Millad® 3940 clarifying agent (from Milliken Chemical) sorbitol acetal clarifying agent (i.e., 1,3:2,4-bis(4'-methylbenzylidene) sorbitol).
Engage 8402 (from DOW Chemical) polyethylene octene copolymer with a density of 0.902 and reported index of refraction of 1.504, melt flow 30 grams/10 minutes at 190° C./2.16 kg.
Exact 0203 (from Exxon Chemical), polyethylene octene copolymer, density 0.902, melt flow 3 grams/10 minutes at 190° C./2.16 kg, index of refraction of 1.502.

Melt blends of the selectively hydrogenated styrene block copolymers were made with a 25 mm co-rotating Berstorff twin screw extruder at temperatures around 200° C. Blends of the clarified random polypropylene copolymers with the hydrogenated block copolymers, polyethylene copolymers, and clarifying agents were also made in the same twin screw extruder at the same temperatures. All samples were injection molded at 230° C. on an Engle ES 240 injection molder with highly polished molds and conditioned at 24° C. and 50% relative humidity for at least 24 hours before testing.

Instrumented Impact testing was conducted with a Dynatup 8250 instrument according to ASTM D3763. The 0.125 inch thick disks were impacted at approximately 230 meters/min. For low temperature testing, samples were conditioned at least 2 hours before testing. Results reported were the average of 5 tests at each condition.

Notched Izod Impact testing was done at 24° C. on notched 0.125 inch thick injection molded bars according to ASTM D-256. The results reported was the average of bars with the notch close to the injection molding gate of the bar and at the far end of the bar from the gate. Results were reported in ft-lbs/in.

The haze optical properties were measured on 0.125 inch thick disks with a BYK Gardner Haze-guard plus instrument according to ASTM D-1003. Results were reported in % haze. Disks were injection molded at 230° C. in highly polished molds.

The index of refraction for the various components of the invention were measured using an Abbe refractometer (Atago NAR-IT). Samples were prepared for index of refraction measurement by compression molding at 180° C. to 200° C. between films of poly(ethylene terephthalate) (PET). After cooling to room temperature the PET film was carefully removed leaving smooth sample surfaces to press against the prism of the refractometer.

Example 1

Blends 1-12 (formulas are parts by weight of each component) show, in Table 1, that with two different clarified random polypropylene copolymers it was necessary to both match the index of refraction of the added selectively hydrogenated styrene block copolymer and to add addition clarifying agent to obtain low haze in a 0.125 inch thick molded disk. Blends with 20 wt. % Kraton G 1657 were hazy even if additional clarifying agent was added because the index of refraction is 0.013 refractive index units different from the polypropylene random copolymers. Because the index of refraction of the G 1652 SEBS is closer to the random polypropylene copolymer (within 0.006 refractive index units), blends with 20 wt. % Kraton G 1652 exhibited better haze than G 1657 in the blends which also contain additional clarifying agent. The best haze was obtained when the index of refraction of the blend of Kraton G 1657 and Kraton G 1652 (GH-893) closely matched the polypropylene copolymer and additional clarifying agent was added (8C41-10 is a masterbatch of 10 wt. % sorbitol acetal clarifying agent in polypropylene). If no additional clarifying agent was added the haze was very poor for the blend with GH-893 even though the index of refraction closely matched that of the polypropylene random copolymers. It is believed that the selectively hydrogenated styrene block copolymer interferes with the effectiveness of the clarifying agent and thus additional clarifying agent must be added to compensate for the interference. In this particular example an additional 2,000 ppm of sorbitol acetal clarifying agent was added to the blend to achieve low haze.

As can be seen from the impact results, low temperature impact was significantly improved while achieving low haze.

Example 2

Example 2 shows the level of additional clarifying agent that was required to improve the clarity significantly in Table 2-I. There appeared to be some dependence on the random polypropylene copolymer used but roughly 500 to 1,000 ppm of the additional clarifying agent (or 0.5 wt % to 1 wt % of the 10% masterbatch of clarifying agent in polypropylene) were needed. There were only marginal improvements in the clarity (haze) above these levels of clarifying agent.

Blend 19 (Table 2-II) showed that additional pure clarifying agent could be added as well as masterbatches of the clarifying agent in polypropylene to achieve improved clarity and low haze.

Example 3

Example 3 shows the effect of diluting selectively hydrogenated styrene block copolymers with polyethylene copolymers which also closely match the index of refraction of the random polypropylene copolymers (Table 3). GH-893 was an extruder mixed masterbatch of G 1652/1657. GH-893C was an extruder mixed masterbatch of G1652/G1657/Engage 8402 where the polyethylene copolymer Engage 8402 was 33 wt. % of the masterbatch. GH-893D was an extruder mixed masterbatch of G1652/G1657/Engage 8402 where the Engage 8402 was 25 wt. % of the masterbatch. As can be seen from blend 23 polyethylene copolymers such as Exact 0203 which match the index of refraction of the polypropylene made low haze blends with clarified polypropylene random copolymer with no additional clarifying agent. However, polyethylene copolymers such as Exact 0203 and Engage 8402 which matched the index of refraction of the clarified polypropylene random copolymer do not have very good low temperature impact properties in polypropylene random copolymers. As can be seen from blends 20 and 21, masterbatching selectively hydrogenated styrenic block copolymers with the polyethylene copolymer significantly improved the low temperature impact while maintaining good low haze as long as additional clarifying agent was added. If ultimate low temperature properties are required, the appropriate pure selectively hydrogenated styrene block copolymer with additional clarifying agent is best. A useful degree of low temperature impact was achieved with blends of polyethylene copolymers and selectively hydrogenated styrene block copolymers when both matched the index of refraction of the random polypropylene copolymer. The selectively hydrogenated styrene block copolymers which matched the index of refraction of the polypropylene random copolymer with appropriate levels of clarifying agent were unique in achieving the best low temperature impact and low haze.

Example 4

Example 4 examines the effect of the GH-893 blend in Flint Hills clarified random polypropylene P5M6K-048 (Table 4). Blends 22 and 23 showed that higher levels of GH-893 (blend of G 1652/G 1657) had better impact but poorer haze when there was no additional clarifying agent. It appeared that the higher levels of polystyrene in the total blend adversely affected haze. Adding additional clarifying agent dramatically improved the haze while maintaining very good low temperature impact down to −30° C.

Example 5

Example 5 shows blends of an SEBS block copolymer (G 1643) which had higher butylene content and was therefore more compatible with the polypropylene random copolymer, forming submicron dispersions which did not scatter light (Table 5-I). As the level of block copolymer increased the haze increased because, it is believed, the increased amount of styrene was interfering with the clarifying agent in the SR-549 random polypropylene copolymer. In addition, the glass transition temperature of the ethylene/butylene rubber midblock was higher (about −35° C. as measured by DSC) than G 1652 or G 1657 which had a Tg around −55 C. The resulting low temperature impact properties were not as good at −20° C. as compared to previous blends with GH-893 (G 1652/G 1657 combination). The G 1643 did significantly improve Izod impact results at room temperature, significantly more than the polyethylene copolymer Engage 8402. The instrumented impact at temperatures down to −10° C. was also improved.

Blend 33 demonstrated that polypropylene or polypropylene random copolymer, clarifying agent and hydrogenated styrene block copolymer could be dry-blended and could then be introduced directly into an injection molding machine which had a suitable mixing section in the screw (Table 5-II). The results show that a twin screw extruded sample, blend 12, and a dry blended sample, blend 33, had similar clarity and impact strength.

The dry blend method is less costly because there is no need for an extra mixing step. It is important to injection mold this composition at a sufficiently high temperature, roughly 220° C. to 230° C., to properly dissolve and disperse the clarifying agent into the polypropylene or random polypropylene copolymer. In this way, the clarifying agent produced the optimum clarity.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

TABLE 1

| Blend # | 1 | 2 | 3 | 4 | 5 | 6 | 7 | 8 | 9 | 10 | 11 | 12 |
|---|---|---|---|---|---|---|---|---|---|---|---|---|
| SR549M | 100 | | 80 | 80 | 78 | 78 | | | 80 | | 78 | |
| 6823 | | 100 | | | | | 78 | 78 | | 80 | | 78 |
| G 1657 | | | 20 | | 20 | | 20 | | | | | |
| G 1652 | | | | 20 | | 20 | | 20 | | | | |

TABLE 1-continued

| Blend # | 1 | 2 | 3 | 4 | 5 | 6 | 7 | 8 | 9 | 10 | 11 | 12 |
|---|---|---|---|---|---|---|---|---|---|---|---|---|
| GH-893 | | | | | | | | | 20 | 20 | 20 | 20 |
| 8C41-10 | | | | | 2 | 2 | 2 | 2 | | | 2 | 2 |
| Haze (%) | 29 | 36 | 83 | 88 | 77 | 42 | 92 | 47 | 58 | 80 | 31 | 40 |
| Izod (ft-lbs/in) | 1.1 | 6 | | | | | | | 11.1 | 11.5 | 11.7 | 11 |
| Inst. Impact (in-lbs) | | | | | | | | | | | | |
| 24° C. | | 100 | 240 | | | | | | 230 | 220 | 220 | 220 |
| 4° C. | | 40 | 110 | | | | | | | | | |
| −10° C. | | | 4 | | | | | | 260 | 250 | 260 | 250 |
| −20° C. | | 20 | | | | | | | 190 | 270 | 240 | 200 |

TABLE 2-I

| Blend # | 1 | 2 | 9 | 10 | 13 | 14 | 15 | 11 | 16 | 17 | 18 | 12 |
|---|---|---|---|---|---|---|---|---|---|---|---|---|
| SR549M | 100 | | 80 | | 79.5 | 79 | 78.5 | 78 | | | | |
| 6823 | | 100 | | 80 | | | | | 79.5 | 79 | 78.5 | 78 |
| G 1657 | | | | | | | | | | | | |
| G 1652 | | | | | | | | | | | | |
| GH-893 | | | 20 | 20 | 20 | 20 | 20 | 20 | 20 | 20 | 20 | 20 |
| 8C41-10 | | | | | 0.5 | 1 | 1.5 | 2 | 0.5 | 1 | 1.5 | 2 |
| Haze (%) | 29 | 36 | 58 | 80 | 37 | 34 | 34 | 31 | 53 | 43 | 40 | 40 |
| Izod (ft-lbs/in) | 1.1 | 6 | 11.1 | 11.5 | | | | 11.7 | | | | 11.0 |
| Instrumented Impact (in-lbs) | | | | | | | | | | | | |
| 24° C. | 100 | 240 | 230 | 220 | | | | 220 | | | | 220 |
| 4° C. | 40 | 110 | | | | | | | | | | |
| −10° C. | | 4 | 260 | 250 | | | | 260 | | | | 250 |
| −20° C. | 20 | | 190 | 270 | | | | 240 | | | | 200 |

TABLE 2-II

| | Blend | | |
|---|---|---|---|
| | 2 | 12 | 19 |
| 6823 | 100 | 78 | 80 |
| GH-893 | | 20 | 20 |
| 8C41-10 | | 2 | |
| Millad 3940 | | | 0.2 |
| Haze (%) | 36 | 40 | 35 |
| Izod (ft-lbs/in) | 6 | | 11 |
| Instrumented Impact (in-lbs) | | | |
| 24° C. | | 240 | 220 |
| 4° C. | | 110 | |
| −10° C. | | 4 | 250 |
| −20° C. | | | 200 |

TABLE 3

| Blend # | 1 | 11 | 20 | 21 | 22 | 2 | 12 | 23 |
|---|---|---|---|---|---|---|---|---|
| SR549M | 100 | 78 | 78 | 78 | 80 | | | |
| 6823 | | | | | | 100 | 78 | 80 |
| Exact 0203 | | | | | | | | 20 |
| Engage 8402 | | | | | 20 | | | |
| GH-893 | | 20 | | | | | 20 | |
| GH-893C | | | 20 | | | | | |
| GH-893D | | | | 20 | | | | |
| 8C41-10 | | 2 | 2 | 2 | | | 2 | |
| Haze (%) | 29 | 31 | 28 | 28 | | 36 | 40 | 43 |
| Izod (ft-lbs/in) | 1.1 | 11.7 | 12.2 | 12.2 | 2.6 | 6 | 11 | |
| Instrumented Impact (inch-lbs) | | | | | | | | |
| 24° C. | 100 | 220 | 220 | 230 | 230 | 240 | 220 | 230 |
| 4° C. | 40 | | | | 290 | 110 | | 290 |
| −10° C. | | 260 | 260 | 260 | 80 | 4 | 250 | 26 |
| −20° C. | 20 | 240 | 66 | 120 | 10 | | 200 | |

TABLE 4

| | Blend | | | | |
|---|---|---|---|---|---|
| | 24 | 25 | 26 | 27 | 28 |
| P5M6K-048 | 100 | 85 | 80 | 78 | 73 |
| GH-893 | | 15 | 20 | 20 | 25 |
| 8C41-10 | | | | 2 | 2 |
| Haze (%) | 40 | 58 | 79 | 37 | 33 |
| Instrumented Impact (in-lbs) | | | | | |
| 24° C. | 140 | 210 | 230 | | |
| 4° C. | | | | | |
| −10° C. | 2 | 140 | 250 | | |
| −20° C. | 2 | 90 | 180 | 370 | 370 |
| −30° C. | | | 150 | 360 | 300 |

TABLE 5-I

| Blend # | 1 | 29 | 30 | 31 | 32 | 22 | 11 |
|---|---|---|---|---|---|---|---|
| SR549M | 100 | 95 | 90 | 85 | 80 | 80 | 78 |
| Kraton G 1643 | 0 | 5 | 10 | 15 | 20 | | |
| Engage 8402 | | | | | | 20 | |
| GH-893 | | | | | | | 20 |
| 8C41-10 | | | | | | | 2 |
| Haze (%) | 29 | | 44 | | 51 | | 31 |
| IMPACT PROPERTIES | | | | | | | |
| Notched Izod Impact @ 24° C. (ft-lbs/in) | 1.1 | — | 6.2 | 10.1 | 12.5 | 2.6 | 11.7 |
| Instrumented Impact @ 24° C. (in-lbs) | 100 | 310 | 310 | 300 | 300 | 230 | 220 |
| Instrumented Impact @ 4° C. | 40 | 70 | 250 | 350 | 340 | 290 | |
| INSTRUMENTED IMPACT @ −10° C. | — | — | 40 | 40 | 300 | 80 | 260 |
| INSTRUMENTED IMPACT @ −20° C. | 20 | 20 | 30 | 30 | 30 | 10 | 240 |

TABLE 5-II

|  | Blend # | | |
|---|---|---|---|
|  | 9<br>Premixed in twin<br>screw extruder | 11<br>Premixed in twin<br>screw extruder | 33<br>Dry<br>blended |
| SR549M | 80 | 78 | 78 |
| GH-893 | 20 | 20 | 20 |
| 8C41-10 |  | 2 | 2 |
| Haze (%) | 58 | 31 | 30 |
| Izod (ft-lbs/in) | 11.1 | 11.7 | — |
| Instrumented Impact (inch-lbs) | | | |
| 24° C. | 230 | 220 | 270 |
| −10° C. | 260 | 260 | 360 |
| −20° C. | 190 | 240 | 240 |

What is claimed is:

1. A molding composition of at least the following 3 components, comprising:
at least about 70% by weight of a polypropylene or polypropylene random copolymer; up to 30% by weight of a block copolymer composition comprising at least one selectively hydrogenated styrene diene block copolymer having the general formula of S-HD-S or $(S-HD)_x$-Z, where S is polymerized block of monoalkenyl aromatic hydrocarbon monomers, HD is a hydrogenated block of polymerized conjugated diene monomer or monomers, and Z is a coupling agent, and x is the number of arms which can vary from 1 to 20, and at least 2500 ppm of a clarifying agent conforming to the structure of Formula (I)

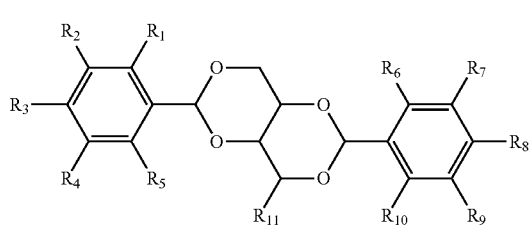

(I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, carboxyl groups, and halogens; and $R_{11}$ is a hydroxyalkyl group selected from the group consisting of —$CH_2OH$ and —$CHOHCH_2OH$, wherein said block copolymer composition has a refractive index that substantially matches said polypropylene or polypropylene random copolymer (+/−0.008 refractive index units) and the glass transition temperature of the HD block is about −50° C. to −55° C. as measured by DSC.

2. The molding composition of claim 1, wherein the HD block is a hydrogenated block of polymerized 1,3-butadiene having a butylene content of about 40 wt % and the S block is a polystyrene block.

3. The molding composition of claim 1, wherein said polypropylene random copolymer includes up to 6% by weight randomly copolymerized monomer selected from the group consisting of ethylene, butylene, hexene, and octene, based on the weight of said polypropylene random copolymer.

4. The molding composition of claim 1, wherein said block copolymer composition has a refractive index of about 1.503.

5. The molding composition of claim 1, wherein said clarifying agent is present in the composition in an amount that includes the amount of clarifying agent normally incorporated in the polypropylene or polypropylene random copolymer and an added amount of at least 500 ppm, and wherein the total amount of clarifying agent present in the composition is from 2500 ppm to about 7000 ppm of said molding composition.

6. The molding composition of claim 1, wherein a 0.125 inch thick injection molded disk of said composition has an instrumented impact strength of at least 100 inch-lbs at about −20° C. to −30° C.

7. The molding composition of claim 1, wherein said composition has no more than 50% haze in a 0.125 inch thick injection molded disk.

8. The molding composition of claim 1, wherein said $R_1$, $R_4$, $R_5$, $R_6$, $R_7$, and $R_{10}$ are each hydrogen, $R_2$, $R_3$, $R_8$, and $R_9$ are each methyl groups, and $R_{11}$ is —$CHOHCH_2OH$.

9. The molding composition of claim 1, wherein said block copolymer composition is a mixture of two or more selectively hydrogenated styrene diene block copolymers having different refractive indicies where the mixture has an average index of refraction that substantially matches the refractive index of said polypropylene or polypropylene random copolymer.

10. The molding composition of claim 9, wherein said mixture contains selectively hydrogenated block copolymers each having from about 10 to about 35% by weight polystyrene and where the average styrene content of the mixture is about 23-26% wt based on the weight of said selectively hydrogenated block copolymer.

11. The molding composition of claim 1, wherein said block copolymer composition comprises a mixture in which the selectively hydrogenated block copolymer is replaced by up to 50% of a polyethylene copolymer that substantially matches the refractive index of the polypropylene or random polypropylene copolymer.

12. The molding composition of claim 11, wherein said polyethylene copolymer has a density of about 0.9 g/cm³.

13. A molded article produced from a composition having at least the following 3 components, comprising:
at least about 80% by weight of a polypropylene or polypropylene random copolymer, up to 20% by weight of a block copolymer composition comprising at least one selectively hydrogenated block copolymer having the general formula S-HD-S or $(S-HD)_x$-Z, where S is a block of polymerized monoalkenyl aromatic hydrocarbon monomer, HD is a block of hydrogenated polymerized conjugated diene monomer or monomers, and Z is a coupling agent, and x is the number of arms which can vary from 1 to 20; and at least 2500 ppm of a clarifying agent conforming to the structure of Formula (I)

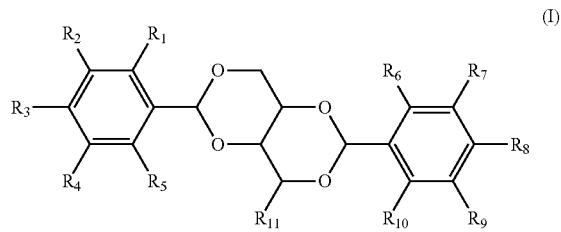

(I)

wherein $R_1$, $R_2$, $R_3$, $R_4$, $R_5$, $R_6$, $R_7$, $R_8$, $R_9$, and $R_{10}$ are each independently selected from the group consisting of hydrogen, alkyl groups, alkoxy groups, alkenyl groups, aryl groups, carboxyl groups, and halogens; and $R_{11}$ is a hydroxyalkyl group selected from the group consisting of —$CH_2OH$ and —$CHOHCH_2OH$, wherein said selectively hydrogenated block copolymers have a refractive index that substantially matches said polypropylene or polypropylene random copolymer (within +/−0.008 refractive index units).

14. The molded article of claim 13, wherein said article is a freezer food container.

15. The molded article of claim 13, having no more than 50% haze and an instrumented impact strength of at least about 100 inch-lbs at −20° C. to −30° C. as determined on an injection molded disk with a thickness of about 0.125 inch.

16. The molded article of claim 13, wherein $R_1$, $R_4$, $R_5$, $R_6$, $R_7$, and $R_{10}$ are each hydrogen, $R_2$, $R_3$, $R_8$, and $R_9$ are each methyl groups, and $R_{11}$ is —$CHOHCH_2OH$.

17. The molded article of claim 13, wherein said S-HD-S or $(S-HD)_x$-Z can be a mixture of such selectively hydrogenated block copolymers having different refractive indicies, but an average index of refraction that substantially matches the refractive index of said polypropylene or polypropylene random copolymer (+/−0.008 refractive index units).

18. The molded article of claim 13, wherein said clarifying agent is present in the composition in an amount that includes the amount of clarifying agent normally incorporated in the polypropylene or polypropylene random copolymer and an additional amount such that the total amount of clarifying agent present in the composition is from 2500 ppm to about 7000 ppm of said composition.

* * * * *